(12) United States Patent
Ma

(10) Patent No.: US 9,398,254 B2
(45) Date of Patent: Jul. 19, 2016

(54) METHOD FOR IMPLEMENTING TELEPRESENCE TECHNOLOGY AND TELEPRESENCE DEVICE

(71) Applicant: ZTE Corporation, Shenzhen (CN)

(72) Inventor: Zheng Ma, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/422,226

(22) PCT Filed: Jul. 25, 2013

(86) PCT No.: PCT/CN2013/080112
§ 371 (c)(1),
(2) Date: Feb. 18, 2015

(87) PCT Pub. No.: WO2013/178169
PCT Pub. Date: Dec. 5, 2013

(65) Prior Publication Data
US 2015/0244978 A1    Aug. 27, 2015

(30) Foreign Application Priority Data
Aug. 24, 2012    (CN) .......................... 2012 1 0305221

(51) Int. Cl.
*H04N 7/14* (2006.01)
*H04L 29/08* (2006.01)
(Continued)

(52) U.S. Cl.
CPC .......... *H04N 7/147* (2013.01); *H04L 29/06326* (2013.01); *H04L 65/1069* (2013.01);
(Continued)

(58) Field of Classification Search
USPC .......... 348/14.09, 14.13, 14.07, 14.08, 14.16, 348/E7.083, E07.084, E07.077; 709/204, 709/227, 231*H04L65/4046* (2013.01); *H04L 65/607* (2013.01); *H04L 65/608* (2013.01);
See application file for complete search history.

(56) References Cited

U.S. PATENT DOCUMENTS

2009/0164575 A1    6/2009   Barbeau
2011/0292161 A1*  12/2011   Sharon ................... H04N 7/142
                                                              348/14.07

(Continued)

FOREIGN PATENT DOCUMENTS

CN    102123266 A    7/2011
CN    102457700 A    5/2012

OTHER PUBLICATIONS

International Search Report for corresponding application PCT/CN2013/080112 filed Jul. 25, 2013; Mail date Nov. 7, 2013.

*Primary Examiner* — Yosef K Laekemariam
(74) *Attorney, Agent, or Firm* — Cantor Colburn LLP

(57) ABSTRACT

Disclosed are a method for implementing telepresence technology and a telepresence device. The method comprises: a first telepresence device establishes a communication connection with a second telepresence device, wherein the first telepresence device performs a first capability negotiation with the second telepresence device during the communication connection establishment; the first telepresence device performs a TIP capability negotiation with the second telepresence device; the first telepresence device and the second telepresence device determine, according a result of the first capability negotiation and a result of the TIP capability negotiation, an audio and video coding/decoding mode used in the following communication; and the first telepresence device communicates with the second telepresence device according to the determined audio and video coding/decoding mode. The disclosure solves a technical problem in the prior art that new audio and video coding/decoding modes cannot be used because content of a TIP protocol is not updated in time.

13 Claims, 6 Drawing Sheets

(51) Int. Cl.
 *H04L 29/06* (2006.01)
 *H04N 7/15* (2006.01)
(52) U.S. Cl.
 CPC ............ *H04L 67/141* (2013.01); *H04L 67/24* (2013.01); *H04N 7/148* (2013.01); *H04N 7/152* (2013.01); *H04N 7/15* (2013.01)

(56) References Cited

U.S. PATENT DOCUMENTS

| | | |
|---|---|---|
| 2012/0057636 A1 | 3/2012 | Tian |
| 2014/0139620 A1* | 5/2014 | Redmann ............... H04N 7/144 348/14.16 |

* cited by examiner

METHOD FOR IMPLEMENTING TELEPRESENCE TECHNOLOGY AND TELEPRESENCE DEVICE

TECHNICAL FIELD

The disclosure relates to the field of communications, and in particular to a method for implementing telepresence technology and a telepresence device.

BACKGROUND

The telepresence technology is a teleconference technology which appears in recent years and integrates video communication and communication experience. This technology is characterized by having a life size, super high definition and low time delay and is focused on an effect of almost real face-to-face communications, and the implementation process relates to a plurality of aspects such as networks, communications, conference environments and function applications, with an integrated real communication experience combined with business applications being ultimately presented to the conference participants.

With the continuous expansion of the promotion and application scope of the telepresence technology, how to realise the interoperability between the telepresence products of various manufacturers becomes a problem which needs to be solved urgently. CISCO Company gradually promotes the Telepresence Interoperability Protocol (TIP) used by the telepresence products thereof to be the interoperability protocol recognized by international telepresence products.

In the TIP protocol, one complete call between two telepresence devices is divided into two phases: the first phase is the call establishment phase, i.e. a normal calling process between two devices needing to perform a media communication, for example, the establishment of a Session Initiation Protocol (SIP) call of an application layer, or the establishment of an H323 call, and the completion of this phase marks the opening of media channels of the two parties; and the second phase is a TIP negotiation phase, which phase is to complete the TIP capability negotiation and the negotiation of media multiplexing parameters, etc. After the two phases are both completed, both communication parties can start a normal media communication and can listen to or watch sounds and images of each other. The media capability used by both communication parties at this moment is the media capability obtained through the TIP capability negotiation.

However, in the existing TIP protocols, there are few types of audio and video capabilities that can be described, only several fixed types, wherein there is only one audio type, AAC_LD; the main video has two types of capabilities, different capabilities being selected according to different rates; and the auxiliary video also has only one type of capability, different frame frequencies being selected according to different rates. The above-mentioned provisions lead to a not very good expansibility. When there appears a new audio and video coding/decoding technology, and if the content of the TIP protocol is not updated in time, that is, when the TIP protocol does not support the new audio and video coding/decoding technology, the telepresence system can not apply the new audio and video coding/decoding technology.

Aiming at the above-mentioned problem, no effective solution has been presented.

SUMMARY

The disclosure provides a method for implementing telepresence technology and a telepresence device so as to at least solve the technical problem in the prior art that when there appears a new audio and video coding/decoding mode, the new audio and video coding/decoding mode can not be used because the content of the TIP protocol is not updated in time.

According to one aspect of an embodiment of the disclosure, a method for implementing a telepresence technology is provided, the method comprising: a first telepresence device establishing a communication connection with a second telepresence device, wherein the first telepresence device performs a first capability negotiation with the second telepresence device during a process of establishing the communication connection; the first telepresence device performing a TIP capability negotiation with the second telepresence device; the first telepresence device and the second telepresence device determining, according to a result of the first capability negotiation and a result of the TIP capability negotiation, an audio and video coding/decoding mode to be used in a subsequent communication process; and the first telepresence device communicating with the second telepresence device according to the determined audio and video coding/decoding mode.

Preferably, the first telepresence device and the second telepresence device determining, according to the result of the first capability negotiation and the result of the TIP capability negotiation, the audio and video coding/decoding mode to be used in the subsequent communication process comprises: determining whether the first telepresence device and the second telepresence device both supports adopting the result of the capability negotiation determined in the process of establishing the communication connection to perform communication; if yes, determining, according to the result of the first capability negotiation and the result of the TIP capability negotiation, the audio and video coding/decoding mode to be used in the subsequent communication process; and if no, taking the result of the TIP capability negotiation as the audio and video coding/decoding mode to be used in the subsequent communication process.

Preferably, the first telepresence device and the second telepresence device determining the audio and video coding/decoding mode to be used in the subsequent communication process in accordance with the following rules: in the case that the first telepresence device and the second telepresence device both support adopting the result of the capability negotiation determined in the process of establishing the communication connection to perform communication, and the first telepresence device and the second telepresence device both choose to adopt the result of the capability negotiation determined in the process of establishing the communication connection to perform communication, determining to adopt the result of the first capability negotiation as the audio and video coding/decoding mode; or in the case that the first telepresence device and the second telepresence device both support adopting the result of the capability negotiation determined in the process of establishing the communication connection to perform communication, and the first telepresence device chooses to adopt the result of the capability negotiation determined in the process of establishing the communication connection to perform communication and the second telepresence device chooses to adopt the result of the TIP capability negotiation to perform communication, adopting a predetermined rule to determine the audio and video coding/decoding mode.

Preferably, the predetermined rule comprises at least one of the following: taking a negotiation result chosen by a device of the first telepresence device and the second telepresence device which serves to initiate a call as the audio and video coding/decoding mode; taking a negotiation result chosen by a device of the first telepresence device and the second telepresence device which serves as a master device in the process of establishing the communication connection as the audio and video coding/decoding mode; or taking a negotiation result determined by a multi-point control unit (MCU) as the audio and video coding/decoding mode.

Preferably, the first telepresence device and the second telepresence device transmit, via an RTCP channel established between the first telepresence device and the second telepresence device or a call signalling channel during the first capability negotiation, the first indication information for indicating whether it supports adopting the result of the capability negotiation determined in the process of establishing the communication connection to perform communication and the second indication information for indicating the negotiation results chosen by itself.

Preferably, the first telepresence device performing the first capability negotiation with the second telepresence device comprises: the first telepresence device and the second telepresence device each performing comparison according to capability information about a counterpart acquired in the process of establishing the communication connection and its own capability information and taking an obtained result as the result of the first capability negotiation.

Preferably, the first telepresence device and the second telepresence device each acquires the capability information about a counterpart from a TIP message.

According to another aspect of an embodiment of the disclosure, a telepresence device is provided which comprises: an establishment unit configured to establish a communication connection with another telepresence device, wherein the establishment unit performs a first capability negotiation with another telepresence device during a process of establishing the communication connection; a negotiation unit configured to perform a TIP capability negotiation with another telepresence device; a determination unit configured to determine, according to the result of the first capability negotiation and the result of the TIP capability negotiation, an audio and video coding/decoding mode adopted in the subsequent communication process; and a communication unit configured to communicate with another telepresence device according to the determined audio and video coding/decoding mode.

Preferably, the determination unit comprises: a first determination module which is configured to determine whether itself and another telepresence device both support adopting the result of the capability negotiation determined in the process of establishing the communication connection to perform communication; a second determination module which is configured to determine in the case that it is determined to be yes, according to the result of the first capability negotiation and the result of the TIP capability negotiation, the audio and video coding/decoding mode adopted in the subsequent communication process; and a third determination module which is configured to take, in the case that it is determined to be no, the result of the TIP capability negotiation as the audio and video coding/decoding mode adopted in the subsequent communication process.

Preferably, the second determination unit comprises: a first choosing sub-module which is configured to determine to adopt the result of the first capability negotiation as the audio and video coding/decoding mode in the case that itself and another telepresence device both support adopting the result of the capability negotiation determined in the process of establishing the communication connection to perform communication, and itself and another telepresence device both choose to adopt the result of the capability negotiation determined in the process of establishing the communication connection to perform communication; or a second choosing sub-module which is configured to adopt the predetermined rules to determine the audio and video coding/decoding mode in the case that itself and another telepresence device both support adopting the result of the capability negotiation determined in the process of establishing the communication connection to perform communication, and itself chooses to adopt the result of the capability negotiation determined in the process of establishing the communication connection to perform communication and another telepresence device chooses to adopt the result of the TIP capability negotiation to perform communication.

In the embodiments of the disclosure, the result of the capability negotiation performed in the process of establishing the communication connection is taken as the reference condition for subsequently determining the audio and video coding/decoding mode ultimately adopted in the communication, instead of taking the result obtained according to the TIP negotiation as the audio and video coding/decoding mode adopted in the communication. By the above-mentioned way, the technical problem in the prior art is solved that when there appears a new audio and video coding/decoding mode, same can not be used because the content of the TIP protocol is not updated in time, thereby achieving the technical effect of improving the expansion capability of the telepresence technology.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The embodiment of the disclosure will be described hereinafter in detail with reference to the accompanying drawings and in conjunction with embodiments. Note that, the embodiments of the disclosure and the features of the embodiments can be combined with each other if there is no conflict.

Figure 1:
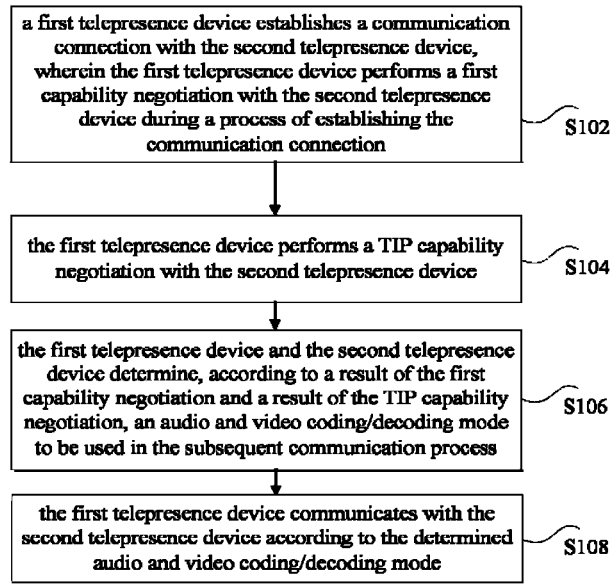
FIG. 1 is a preferred flow chart of a telepresence technology implementation method according to an embodiment of the disclosure.

The embodiment of the disclosure provides a preferred method for implementing telepresence technology, as shown in FIG. 1, the method comprising the following steps:

step S102: a first telepresence device establishes a communication connection with the second telepresence device, wherein the first telepresence device performs a first capability negotiation with the second telepresence device during a process of establishing the communication connection;

step S104: the first telepresence device performs a TIP capability negotiation with the second telepresence device;

step S106: the first telepresence device and the second telepresence device determine, according to a result of the first capability negotiation and a result of the TIP capability negotiation, an audio and video coding/decoding mode to be used in the subsequent communication process; and step S108: the first telepresence device communicates with the second telepresence device according to the determined audio and video coding/decoding mode.

In the above-mentioned preferred embodiment, a result of the capability negotiation performed in the process of establishing the communication connection is taken as a reference condition for subsequently determining the audio and video coding/decoding mode to be ultimately used in the subsequent communication, instead of taking the result of TIP capability negotiation as the audio and video coding/decoding mode to be used in the subsequent communication. By the above-mentioned solution, the technical problem in the prior art that a new audio and video coding/decoding mode can not be used because the content of the TIP protocol is not updated in time, thereby achieving the technical effect of improving the expansion capability of the telepresence technology.

Preferably, the above-mentioned capability negotiation refers to as determining the audio and video coding/decoding mode that is supported by the first telepresence device and the second telepresence device in the communication process.

Figure 2:
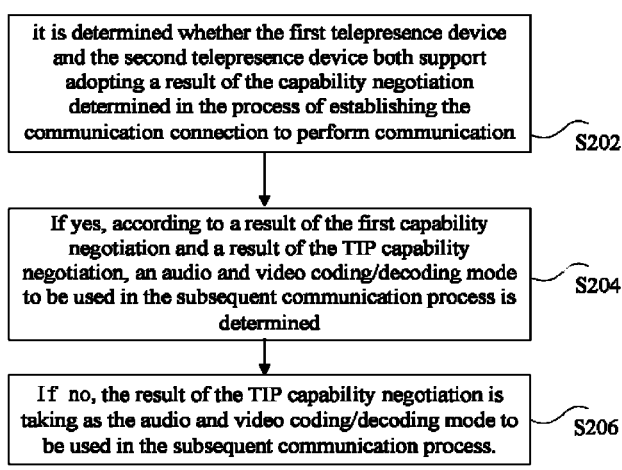
FIG. 2 is another preferred flow chart of a telepresence technology implementation method according to an embodiment of the disclosure.

Considering the problem that not all telepresence devices support adopting a coding/decoding mode determined in the first phase of communication connection establishment to perform communication, a judging process may be added that detects whether the two parties both support the negotiation result of the first phase. In a preferred embodiment, the first telepresence device and the second telepresence device determines, according to the result of the first capability negotiation and the result of the TIP capability negotiation, the audio and video coding/decoding mode adopted in the subsequent communication process. As shown in FIG. 2, the method comprises:

step S202: it is determined whether the first telepresence device and the second telepresence device both support adopting a result of the capability negotiation determined in the process of establishing the communication connection to perform communication, and if yes, performing step S204, otherwise, performing step S206;

step S204: according to a result of the first capability negotiation and a result of the TIP capability negotiation, an audio and video coding/decoding mode to be used in the subsequent communication process is determined; and step S206: the result of the TIP capability negotiation is taking as the audio and video coding/decoding mode to be used in the subsequent communication process.

That is, only in the case that the two parties both support adopting the negotiation result of the first phase, the negotiation result of the first phase and the TIP negotiation result may be adopted to collectively determine the audio and video coding/decoding mode; otherwise, the TIP negotiation result will be directly adopted to determine the audio and video coding/decoding mode. By the above-mentioned solution, the telepresence devices which do not support the capability negotiation result of the first phase may also be connected to the telepresence system, thereby improving the compatibility of the telepresence technology.

Even if in the case that it is detected that both communication parties both support the negotiation result of the first phase (i.e. the capability negotiation result determined in the process of establishing the communication connection), different strategies may also be selected according to different choices of the two parties, for example, the following two cases:

case one: in the case that the first telepresence device and the second telepresence device both support adopting the result of the capability negotiation determined in the process of establishing the communication connection to perform communication, and the first telepresence device and the second telepresence device both choose to adopt the result of the capability negotiation determined in the process of establishing the communication connection to perform communication, it is determined that the result of the first capability negotiation (the capability negotiation result determined in the process of establishing the communication connection) is adopted as the audio and video coding/decoding mode;

case two: in the case that the first telepresence device and the second telepresence device both support adopting the result of the capability negotiation determined in the process of establishing the communication connection to perform communication, the first telepresence device chooses to adopt the result of the capability negotiation determined in the process of establishing the communication connection to perform communication, and the second telepresence device chooses to adopt the result of the TIP capability negotiation to perform communication, a predetermined rule is adopted to determine the audio and video coding/decoding mode.

Preferably, the above-mentioned predetermined rule comprises, but is not limited to, at least one of the following:

1) a negotiation result chosen by a device of the first telepresence device and the second telepresence device which serves to initiate a call is taken as the audio and video coding/decoding mode;

2) a negotiation result chosen by a device of the first telepresence device and the second telepresence device which serves as a master device in the process of establishing the communication connection is taken as the audio and video coding/decoding mode; or 3) a negotiation result determined by a multi-point control unit is taken as the audio and video coding/decoding mode.

When determining the capability negotiation result, the first telepresence device and the second telepresence device each needs to transmit, to the counterpart, its own capability parameters, and whether itself supports the result of the first capability negotiation and which capability negotiation result it selects. Preferably, these messages may all be transmitted via a Real-time Transport Protocol (RTP) Control Protocol (RTCP) channel established between the first telepresence device and the second telepresence device or a call signalling channel during the first capability negotiation. That is, these negotiation results and relevant information can be transmitted via the RTCP channel, and may also be transmitted via the call signalling channel adopted in the process of establishing the communication connection.

In the above-mentioned various preferred embodiments, the result of the first capability negotiation may be audio and video coding/decoding modes which are supported by both communication parties, for example, the audio and video coding/decoding modes which are supported by both communication parties may be determined by means of getting intersection elements of the sets: when the first telepresence device supports manners 1, 2 and 3, and the second telepresence device supports manners 2, 3 and 4, it may be determined that the capability negotiation result of the first phase is manners 2 and 3. In a preferred embodiment, the first telepresence device performing the first capability negotiation with the second telepresence device comprises: the first telepresence device and the second telepresence device each performs comparison according to the capability information about the counterpart acquired in the process of establishing the communication connection and its own capability information and takes the obtained result as the result of the first capability negotiation.

Preferably, when acquiring the capability information about the counterpart, the first telepresence device and the second telepresence device each may acquire same from a TIP message therebetween.

Figure 3:
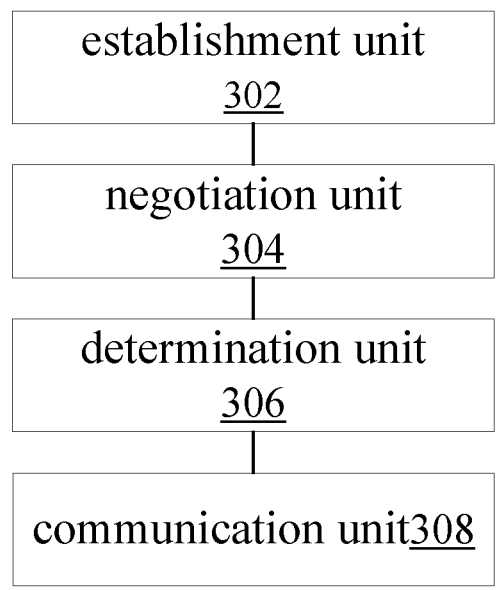
FIG. 3 is a preferred structure block diagram of a telepresence device according to an embodiment of the disclosure.

In an embodiment, a telepresence device is also provided, wherein the device is used for implementing the above-mentioned embodiments and preferred embodiments, which have been described, thereby needing no further description. As used herein after, the term "unit" or "module" is the combination of software and/or hardware which can realise a pre-determined function. Although the apparatus described in the following embodiments is preferably implemented in software, implementation in hardware or the combination of software and hardware is also possible and contemplated. FIG. 3 is a preferred structure block diagram of a telepresence device according to an embodiment of the disclosure, as shown in FIG. 3, the device comprising: an establishment unit 302, a negotiation unit 304, a determination unit 306 and a communication unit 308. The structure will be described below.

The establishment unit 302 is configured to establish a communication connection with another telepresence device, wherein the establishment unit performs the first capability negotiation with another telepresence device during the process of establishing the communication connection;

the negotiation unit 304 is coupled with the establishment unit 302 and is configured to perform a TIP capability negotiation with another telepresence device;

the determination unit 306 is coupled with the negotiation unit 304 and is configured to determine, according to the result of the first capability negotiation and the result of the TIP capability negotiation, an audio and video coding/decoding mode to be used in the subsequent communication process; and the communication unit 308 is coupled with the determination unit 306 and is configured to communicate with another telepresence device according to the determined audio and video coding/decoding mode.

Figure 4:
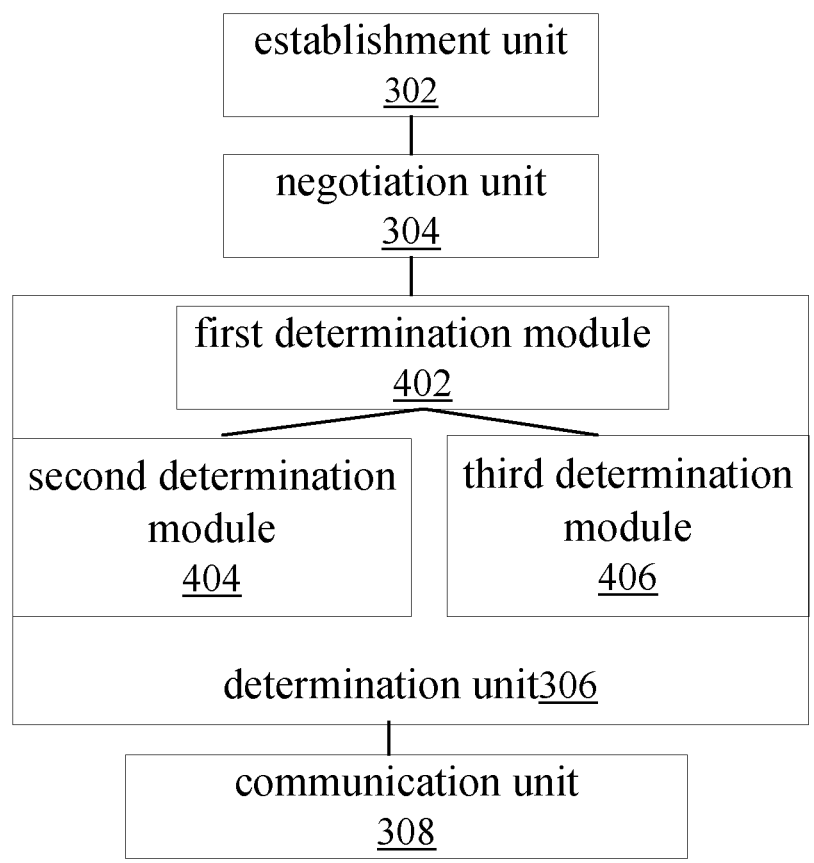
FIG. 4 is another preferred structure block diagram of a telepresence device according to an embodiment of the disclosure.

In a preferred embodiment, as shown in FIG. 4, the determination unit 306 comprises:

a first determination module 402 configured to determine whether itself and another telepresence device both support adopting the result of the capability negotiation determined in the process of establishing the communication connection to perform communication;

a second determination module 404 coupled with the first determination module 402 and configured to determine, according to the result of the first capability negotiation and the result of the TIP capability negotiation, the audio and video coding/decoding mode to be used in the subsequent communication process if a result of determining is yes; and a third determination module 406 coupled with the first determination module 402 and is configured to take the result of the TIP capability negotiation as the audio and video coding/decoding mode to be used in the subsequent communication process if the result of determining is no.

Figure 5:
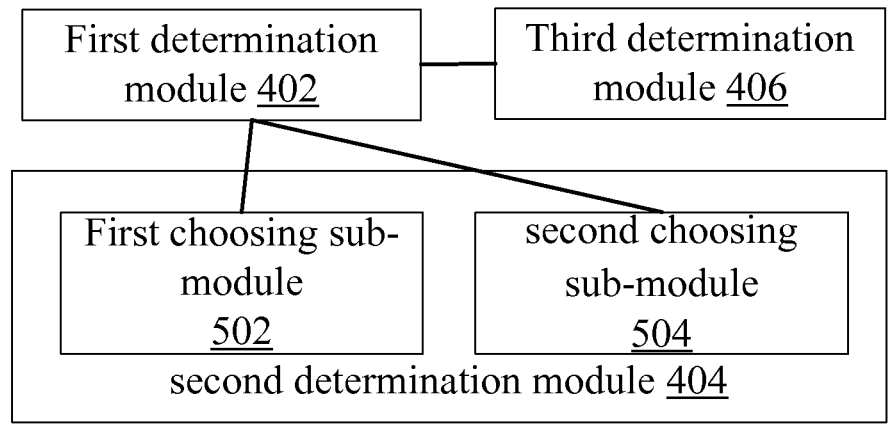
FIG. 5 is still another preferred structure block diagram of a telepresence device according to an embodiment of the disclosure.

In a preferred embodiment, as shown in FIG. 5, the second determination unit 404 comprises:

a first choosing sub-module 502 coupled with the first determination module 402 and configured to determine to adopt the result of the first capability negotiation as the audio and video coding/decoding mode in the condition that itself and another telepresence device both support adopting the result of the capability negotiation determined in the process of establishing the communication connection to perform communication, and itself and another telepresence device both choose to adopt the result of the capability negotiation determined in the process of establishing the communication connection to perform communication; or a second choosing sub-module 504 coupled with the first determination module 402 and configured to adopt the pre-determined rules to determine the audio and video coding/decoding mode in the condition that itself and another telepresence device both support adopting the result of the capability negotiation determined in the process of establishing the communication connection to perform communication, and itself chooses to adopt the result of the capability negotiation determined in the process of establishing the communication connection to perform communication and another telepresence device chooses to adopt the result of the TIP capability negotiation to perform communication.

In an embodiment of the disclosure, a telepresence system is also provided, which comprises a plurality of the above-mentioned telepresence devices and performs media communications via the above-mentioned telepresence devices.

Aiming at the problem that the current TIP protocols have low expansibilities, the embodiments of the disclosure provide a good solution which can well expand the calling capability negotiation of the telepresence system, thereby supporting more capability types in the communication process, and meanwhile when there is a telepresence device which does not support the solution, the capability prescribed in the TIP protocol can also be used, thereby further improving the universality of this telepresence technology.

Figure 6:
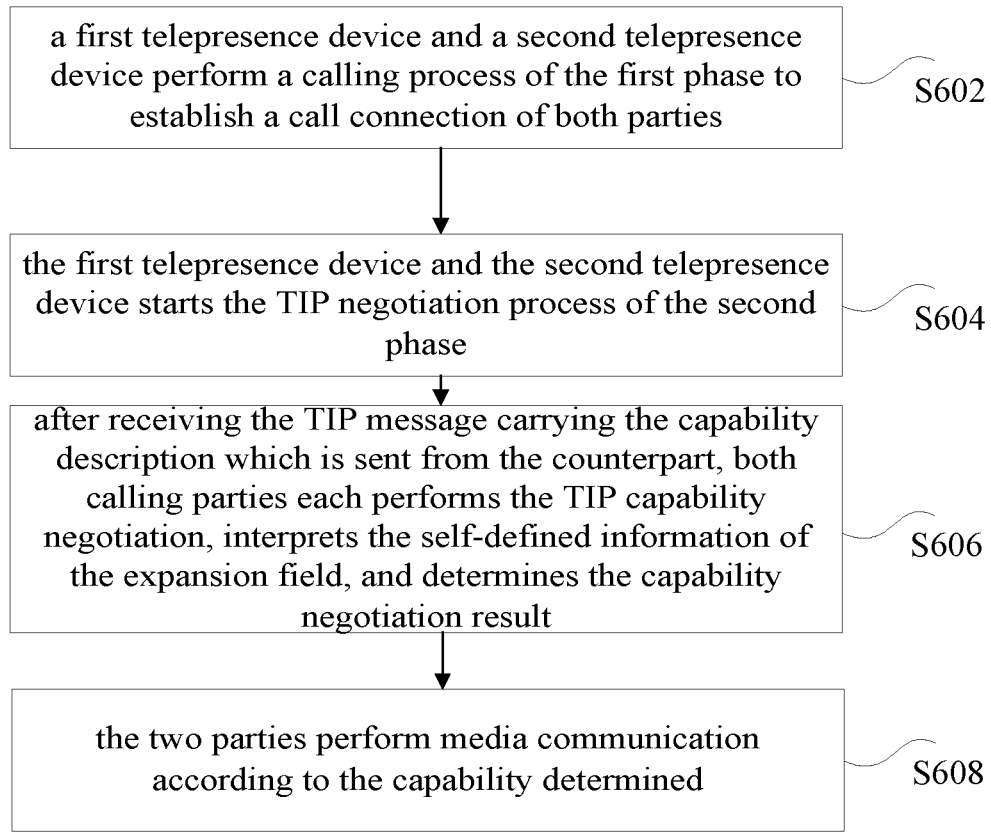
FIG. 6 is a preferred flow chart of two parties of the telepresence device completing the calling process according to an embodiment of the disclosure.

The embodiment of the disclosure also provides a method showing telepresence devices complete a calling process. As shown in FIG. 6, the method comprises the following steps:

step S602: a first telepresence device and a second telepresence device perform a calling process of the first phase to establish a call connection of both parties;

step S604: after successfully establishing the call connection, the media channels are opened, the first telepresence device and the second telepresence device starts the TIP negotiation process of the second phase. In this process, the first telepresence device and the second telepresence device may each transmit a TIP message which is used for describing the capability of the local terminal via an RTCP channel in the media channels, and preferably, self-defined information is carried in an expansion field describing the capability, wherein the self-defined information comprises, but is not limited to at least one of the following:

1) whether the local terminal supports the capability negotiation result of the first phase, i.e. the calling process;

2) the result of the TIP capability negotiation determined by the local terminal;

3) with regard to the results of the above-mentioned two capability negotiations, which negotiation result is preferred by the local terminal as the ultimate capability of the terminal.

As defined hereinabove, the self-defined information may be transmitted via the TIP message in the RTCP channel and may also be transmitted via the call signalling channel during the first capability negotiation; it is noted that the above transmission manners are only for better description of the embodiments of the disclosure, but the specific implementation is not limited thereto.

It is noted that although in the above-mentioned embodiments, the TIP message is taken as an example to explain how to bear the self-defined information, the embodiments of the disclosure are not limited thereto, and other bearing manners may also be adopted to bear the expanded self-defined information, for example, a message specialized for sending the above-mentioned self-defined information may be re-added, with both of the telepresence devices which need to perform the communication certainly needing to send such a message.

Step S606: after receiving the TIP message carrying the capability description which is sent from the counterpart terminal, both calling parties each performs the TIP capability negotiation, interprets the self-defined information of the expansion field, and determines the capability negotiation result according to, but is not limited to one of the following rules:

1) if the local terminal and the counterpart terminal both support using the capability negotiation result of the first phase, i.e. the calling process, and the preferred results of both parties are consistent, the preferred result of both parties is used as the audio and video capability for the ultimately media communication;

2) if only one party of the two parties supports using the capability negotiation result of the first phase, i.e. the calling process, the TIP negotiation result is used as the audio and video capability for both parties to perform the ultimately media communication;

3) if the two parties both support using the capability negotiation result of the first phase, i.e. the calling process, but the preferred sequences of the two parties are inconsistent, that is, one party prefers the capability negotiation result of the first phase, i.e. the calling process, while the other party prefers the result of the TIP capability negotiation. In the case, the ultimate audio and video capability may be determined using one of the following rules, but is not limited thereto:

3-1) a preferred result chosen by the calling party serves as the ultimate capability;

3-2) a preferred result chosen by a party which is the master party according to the master-slave negotiation result (if there is any) in the first phase serves as the ultimate capability;

3-3) it is determined by the device types of the two parties, the devices follows the determination of a multi-point control unit (MCU), that is, a prefered result chosen by the MCU serves as the ultimate capability;

step S608: the two parties determine, in accordance with the capability determined in step S606, the audio and video capability used in the media communication, and send media code streams encoded by the audio and video capability to the counterpart telepresence device, so that the media communication starts and the calling establishment process ends.

By the method of the above-mentioned embodiment of the disclosure, even if there appears a new audio and video coding/decoding technology in the future, and even if the TIP message does not support this kind of audio and video coding/decoding technology, so long as the audio and video coding/decoding technology is identified to be supported in the capability description in the calling process of the first phase, and the capability negotiation result of the first phase, i.e. the calling process, is preferred in the TIP negotiation, the audio and video coding/decoding technology may be used in the ultimate media communication, rather than that the telepresence devices of the two calling parties may use the new audio and video coding/decoding technology only when the new audio and video coding/decoding technology must be supported in the TIP protocol like in the prior art, thereby effectively improving the transmission capability of the telepresence technology.

Hereinafter, the embodiments of the disclosure will be further described in combination with a specific embodiment.

Figure 7:
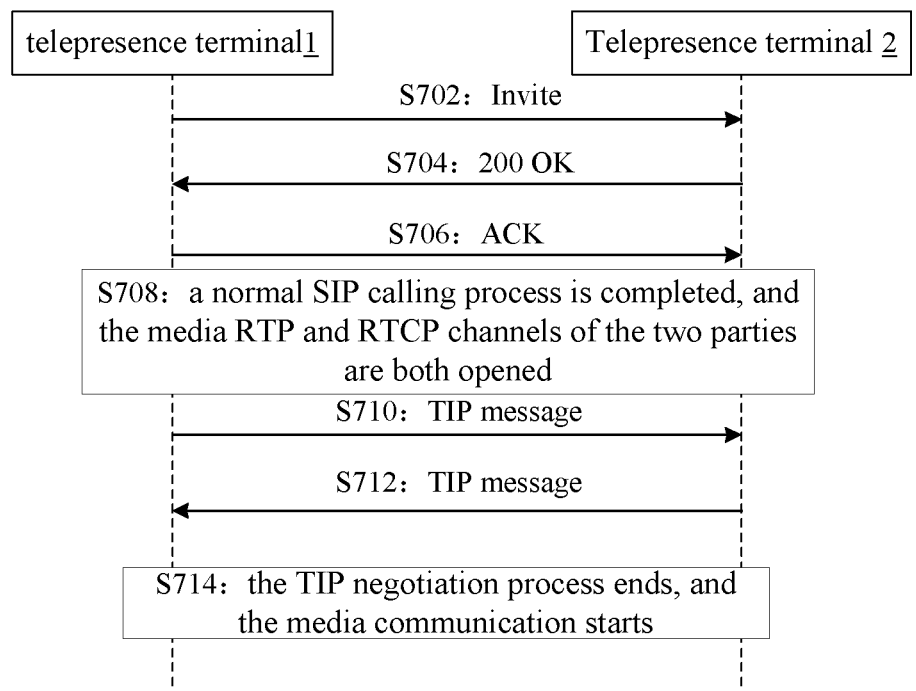
FIG. 7 is another preferred flow chart of two parties of the telepresence device completing the calling process according to an embodiment of the disclosure.

FIG. 7 shows a complete calling process using the TIP protocol in an embodiment of the disclosure. As shown in FIG. 7, this process comprises the following steps:

A telepresence terminal 1 and a telepresence terminal 2 intend to establish a call connection, and in the present embodiment, an SIP (which is an IP-based application layer control protocol and is defined by IETF, and the full name thereof in English is Session Initiation Protocol) call to be established is taken as an example.

Step S702: the telepresence terminal 1 sends an Invite message to the telepresence terminal 2 to initiate a call, the Invite message carrying the media description SDP (which is an application layer control protocol for describing multimedia sessions and is a text-based protocol for negotiating the media types and encoding schemes in the session establishment process, etc., and the full name thereof in English is Session Description Protocol) of the local terminal.

Step S704: after receiving the call request, the telepresence terminal 2 agrees to accept the call and sends a 200 OK message to the calling party, and meanwhile carries its own capability description SDP in the 200 OK message.

Step S706: after receiving the response message of the counterpart, the telepresence terminal 1 acknowledges the call and sends an ACK message.

Step S708: a common SIP calling process is completed, and the media RTP and RTCP channels of the two parties are both opened.

Step S710: after the call establishment is completed, the TIP negotiation process is started, wherein the telepresence terminal 1 sends a TIP message of the local terminal to the telepresence terminal 2 via the RTCP channel, the TIP message carrying the telepresence capability description of the local terminal and the parameters related to media multiplexing, and also carrying a capability expansion field, with the field carrying the capability result supported by the local terminal and the preferred capability result informatics.

Step S712: at the same time, the telepresence terminal 2 also sends a TIP message of the local terminal to the telepresence terminal 1 via the RTCP channel, the TIP message carrying the telepresence capability description of the local terminal and the parameters related to media multiplexing, and also carrying a capability expansion field which carries the capability result supported by the local terminal and the preferred capability result informatics.

Step S714: after receiving the TIP messages from the counterparts, the telepresence terminal 1 and the telepresence terminal 2 complete the TIP negotiation; so far, a complete telepresence call ends, and the two parties start the media communication in accordance with the result of the TIP capability negotiation.

Figure 8:
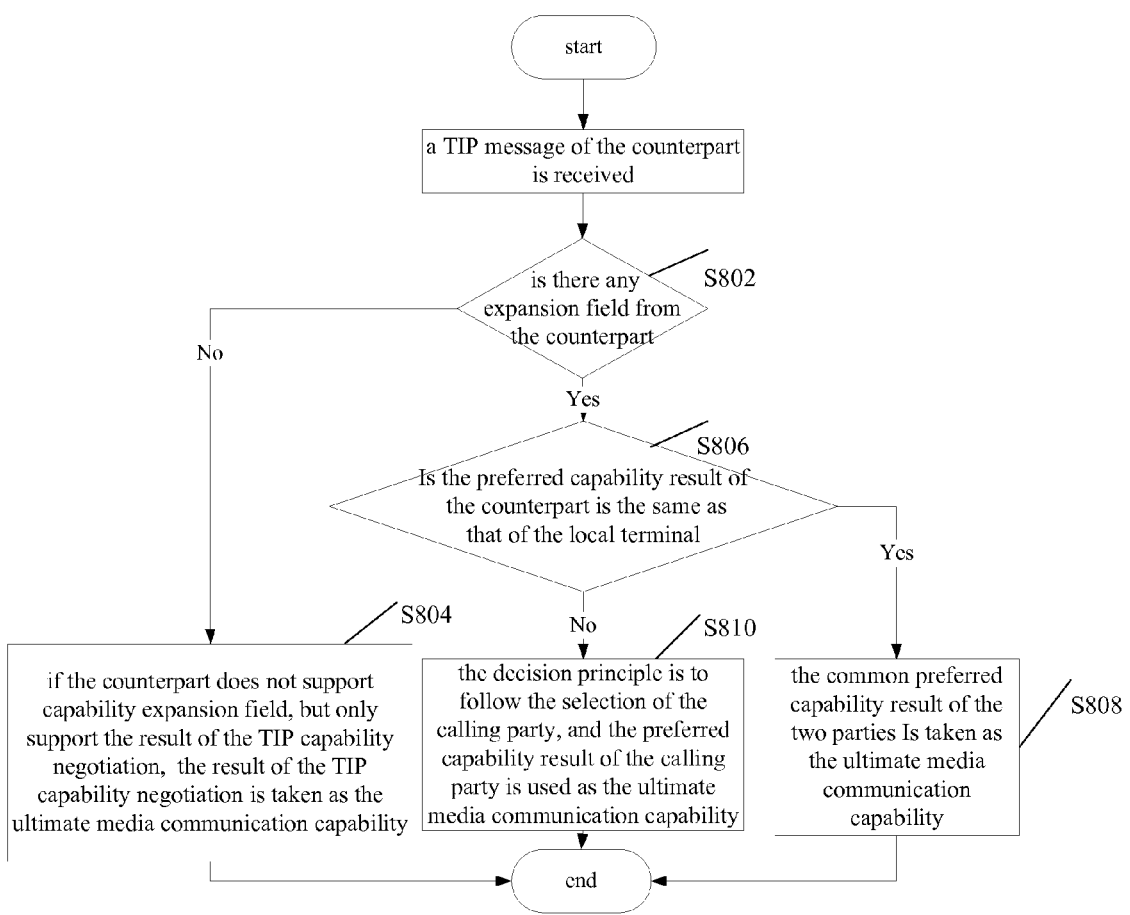
FIG. 8 is a preferred flow chart of determining an ultimate capability negotiation result according to an embodiment of the disclosure.

As shown in FIG. 8, the ultimate capability negotiation result may be determined in accordance with the following steps:

Step S802: when a TIP message sent from the counterpart is received, firstly, it is judged whether there is any expansion field in the TIP message, and if no, turn to step S804; otherwise, turn to step S806.

Step S804: it shows that the counterpart only supports the result of the TIP capability negotiation, thus this call may only use the result of the TIP capability negotiation as the ultimate media communication capability.

Step S806: it is judged whether the preferred capability results of the local terminal and the counterpart are the same, and if yes, turn to step S808; otherwise, turn to step S810.

Step S808: this call takes the common preferred capability result of the two parties as the ultimate media communication capability.

Step S810: it is judged which preferred capability result to follow according to the current decision principles, and in n present preferred embodiment, the preferred capability result of the calling party may be used as the ultimate media communication capability.

In another embodiment, a software is further provided, wherein the software is used for executing the technical solutions described in the above-mentioned embodiments and preferred embodiments.

In another embodiment, a storage medium is further provided, wherein the storage medium stores the above-mentioned software, and the storage medium includes but is not limited to: an optical disk, a soft disk, a hard disk, an erasable memory, etc.

From the description above, it can be seen that the embodiments of the disclosure achieves the following technical effects: the result of the capability negotiation performed in the process of establishing the communication connection is taken as the reference condition for subsequently determining the audio and video coding/decoding mode ultimately adopted in the communication, instead of taking the result obtained according to the TIP negotiation as the audio and video coding/decoding mode adopted in the communication. By the above-mentioned way, the technical problem in the prior art is solved that when there appears a new audio and video coding/decoding mode, same can not be used because the content of the TIP protocol is not updated in time, thereby achieving the technical effect of improving the expansion capability of the telepresence technology.

Obviously, those skilled in the art should know that each of the mentioned modules or steps of the embodiments of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the embodiments of the disclosure are not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

What is claimed is:

1. A method for implementing a telepresence technology, comprising:
   a first telepresence device establishing a communication connection with a second telepresence device, wherein the first telepresence device performs a first capability negotiation with the second telepresence device during a process of establishing the communication connection;
   the first telepresence device performing a Telepresence Interoperability Protocol (TIP) capability negotiation with the second telepresence device;
   the first telepresence device and the second telepresence device determining, according to a result of the first capability negotiation and a result of the TIP capability negotiation, an audio and video coding/decoding mode to be used in a subsequent communication process; and
   the first telepresence device communicating with the second telepresence device according to the determined audio and video coding/decoding mode.

2. The method according to claim 1, wherein the first telepresence device and the second telepresence device determining, according to the result of the first capability negotiation and the result of the TIP capability negotiation, the audio and video coding/decoding mode to be used in the subsequent communication process comprises:
   determining whether the first telepresence device and the second telepresence device both supports communication based on a result of capability negotiation determined in the process of establishing the communication connection;
   if the first telepresence device and the second telepresence device both support communication based on the result of the capability negotiation determined in the process of establishing the communication connection, determining, according to the result of the first capability negotiation and the result of the TIP capability negotiation, the audio and video coding/decoding mode to be used in the subsequent communication process; and
   if the first telepresence device and the second telepresence device do not support communication based on the result of the capability negotiation determined in the process of establishing the communication connection, taking the result of the TIP capability negotiation as the audio and video coding/decoding mode to be used in the subsequent communication process.

3. The method according to claim 1, wherein the first telepresence device and the second telepresence device determining the audio and video coding/decoding mode to be used in the subsequent communication process according to the following rules:
   in the condition that the first telepresence device and the second telepresence device both support the communication based on the result of the capability negotiation determined in the process of establishing the communication connection, and the first telepresence device and the second telepresence device both choose to communicate based on the result of the capability negotiation determined in the process of establishing the communication connection, determining to adopt the result of the first capability negotiation as the audio and video coding/decoding mode; or
   in the condition that the first telepresence device and the second telepresence device both support communication based on the result of the capability negotiation determined in the process of establishing the communication connection, and the first telepresence device chooses to perform communication based on the result of the capability negotiation determined in the process of establishing the communication connection and the second telepresence device chooses to perform communication based on the result of the TIP capability negotiation, determining the audio and video coding/decoding mode according to a predetermined rule.

4. The method according to claim 3, wherein the predetermined rule comprises at least one of the following:

taking a negotiation result chosen by a device of the first telepresence device and the second telepresence device which serves to initiate a call as the audio and video coding/decoding mode;

taking a negotiation result chosen by a device of the first telepresence device and the second telepresence device which serves as a master device in the process of establishing the communication connection as the audio and video coding/decoding mode; or taking a negotiation result determined by a multi-point control unit (MCU) as the audio and video coding/decoding mode.

5. The method according to claim 3, wherein the first telepresence device and the second telepresence device transmit, via an RTCP channel established between the first telepresence device and the second telepresence device or a call signalling channel during the first capability negotiation, first indication information for indicating whether it supports adopting the result of the capability negotiation determined in the process of establishing the communication connection to perform communication and second indication information for indicating the negotiation results chosen by itself.

6. The method according to claim 1, wherein the first telepresence device performing the first capability negotiation with the second telepresence device comprises:

the first telepresence device and the second telepresence device each performing comparison according to capability information about a counterpart acquired in the process of establishing the communication connection and its own capability information and taking an obtained result as the result of the first capability negotiation.

7. The method according to claim 6, wherein the first telepresence device and the second telepresence device each acquires the capability information about a counterpart from a TIP message.

8. A telepresence device, comprising:

an establishment unit configured to establish a communication connection with another telepresence device, wherein the establishment unit performs a first capability negotiation with another telepresence device during a process of establishing the communication connection;

a negotiation unit configured to perform a Telepresence Interoperability Protocol (TIP) capability negotiation with the another telepresence device;

a determination unit configured to determine, according to a result of the first capability negotiation and a result of the TIP capability negotiation, an audio and video coding/decoding mode to be used in a subsequent communication process; and a communication unit configured to communicate with another telepresence device according to the determined audio and video coding/decoding mode.

9. The telepresence device according to claim 8, wherein the determination unit comprises:

a first determination module configured to determine whether the telepresence device itself and another telepresence device both support adopting a result of the capability negotiation determined in the process of establishing the communication connection to perform communication;

a second determination module for determining in the condition that it is determined to be yes, according to the result of the first capability negotiation and the result of the TIP capability negotiation, the audio and video coding/decoding mode to be used in the subsequent communication process; and a third determination module configured to take the result of the TIP capability negotiation as the audio and video coding/decoding mode to be used in the subsequent communication process if the telepresence device itself and another telepresence device do not support adopting a result of the capability negotiation determined in the process of establishing the communication connection to perform communication.

10. The telepresence device according to claim 9, wherein the second determination unit comprises:

a first choosing sub-module configured to determine to adopt the result of the first capability negotiation as the audio and video coding/decoding mode if telepresence device itself and the another telepresence device both support adopting the result of the capability negotiation determined in the process of establishing the communication connection to perform communication, and the telepresence device itself and another telepresence device both choose to adopt the result of the capability negotiation determined in the process of establishing the communication connection to perform communication; or a second choosing sub-module configured to adopt a predetermined rule to determine the audio and video coding/decoding mode if the telepresence device itself and another telepresence device both support adopting the result of the capability negotiation determined in the process of establishing the communication connection to perform communication, and the telepresence device itself chooses to adopt the result of the capability negotiation determined in the process of establishing the communication connection to perform communication and the another telepresence device chooses to adopt the result of the TIP capability negotiation to perform communication.

11. The method according to claim 2, wherein the first telepresence device and the second telepresence device determining the audio and video coding/decoding mode to be used in the subsequent communication process according to the following rules:

in the condition that the first telepresence device and the second telepresence device both support the communication based on the result of the capability negotiation determined in the process of establishing the communication connection, and the first telepresence device and the second telepresence device both choose to communicate based on the result of the capability negotiation determined in the process of establishing the communication connection, determining to adopt the result of the first capability negotiation as the audio and video coding/decoding mode; or in the condition that the first telepresence device and the second telepresence device both support communication based on the result of the capability negotiation determined in the process of establishing the communication connection, and the first telepresence device chooses to perform communication based on the result of the capability negotiation determined in the process of establishing the communication connection and the second telepresence device chooses to perform communication based on the result of the TIP capability negotiation, determining the audio and video coding/decoding mode according to a predetermined rule.

12. The method according to claim 11, wherein the predetermined rule comprises at least one of the following:

taking a negotiation result chosen by a device of the first telepresence device and the second telepresence device which serves to initiate a call as the audio and video coding/decoding mode;

taking a negotiation result chosen by a device of the first telepresence device and the second telepresence device which serves as a master device in the process of establishing the communication connection as the audio and video coding/decoding mode; or taking a negotiation result determined by a multi-point control unit (MCU) as the audio and video coding/decoding mode.

13. The method according to claim 11, wherein the first telepresence device and the second telepresence device transmit, via an RTCP channel established between the first telepresence device and the second telepresence device or a call signalling channel during the first capability negotiation, first indication information for indicating whether it supports adopting the result of the capability negotiation determined in the process of establishing the communication connection to perform communication and second indication information for indicating the negotiation results chosen by itself.

* * * * *